June 29, 1965    H. F. SWENSON    3,191,400
COMPACT VENDING TRUCK
Filed Aug. 9, 1961    2 Sheets-Sheet 1

INVENTOR.
HARVEY F. SWENSON
BY Barnes + Seed
ATTORNEYS

June 29, 1965     H. F. SWENSON     3,191,400
COMPACT VENDING TRUCK

Filed Aug. 9, 1961     2 Sheets-Sheet 2

INVENTOR.
HARVEY F. SWENSON
BY Barnes & Seed
ATTORNEYS

United States Patent Office 3,191,400
Patented June 29, 1965

3,191,400
COMPACT VENDING TRUCK
Harvey F. Swenson, Seattle, Wash., assignor to Sweden Freezer Manufacturing Co., Seattle, Wash., a corporation of Washington
Filed Aug. 9, 1961, Ser. No. 130,415
2 Claims. (Cl. 62—239)

The present invention relates to self-propelled food vending trucks, and particularly to trucks containing dispensing freezers, the frozen product from which is to be sold to customers at the truck site.

The invention aims to provide such a truck which has an unusually compact arrangement.

A further object is to provide an arrangement wherein the operator can readily perform driving, dispensing and serving operations from a single seat.

Other and more particular objects and advantages will appear and be understood in the course of the following description and claims, the invention consisting in the novel construction and in the adaptation and combination of parts hereinafter described and claimed.

Figure 1:
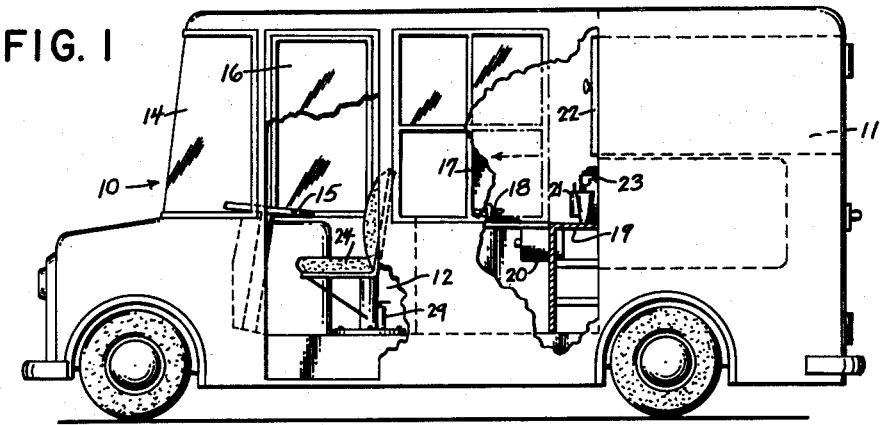
FIGURE 1 is a side elevational view of a vending truck incorporating a first embodiment of the present invention and with part of the side of the vehicle broken away.

Referring to the drawings it is seen that a vending truck 10 with a front engine has its body divided at 13 into a back machinery compartment 11 having rear access doors and a front combination driving and vending compartment 12. The windshield and steering wheel are designated 14, 15 and at its left side the front compartment has a forward access door 16 and an intermediate side window with a sliding pane 17 at the rear half thereof to provide a serving opening. Opposite the side window is a sink 18, and a service counter 19 having a cash drawer 20 and storage shelves therebeneath projects from the divider 13 with one of its ends resting against the side wall of the body directly to the rear of the pane 17. Between the other end of the counter 19 and the sink 18 is located the discharge gate 21 of a dispensing freezer which extends through the divider 13 from the machinery compartment. Housed in the latter is the refrigeration system for the freezer, water storage for supplying the sink 18, and an internal combustion engine giving power for the dasher of the freezer and the compressor of the refrigeration system. Mix for the freezer, flavoring, etc. are stored in a refrigerated cabinet located above the freezer and having its door 22 in the divider 13. An electric mixer 23 may be mounted on the divider above the counter 19.

Figure 2:
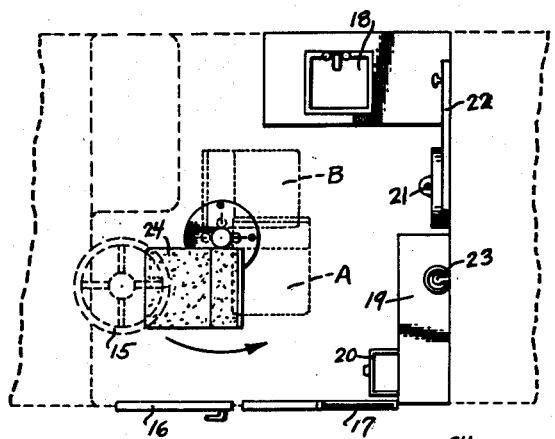
FIG. 2 is a floor plan of the driving and vending compartment of the truck of FIG. 1.
Figure 3:
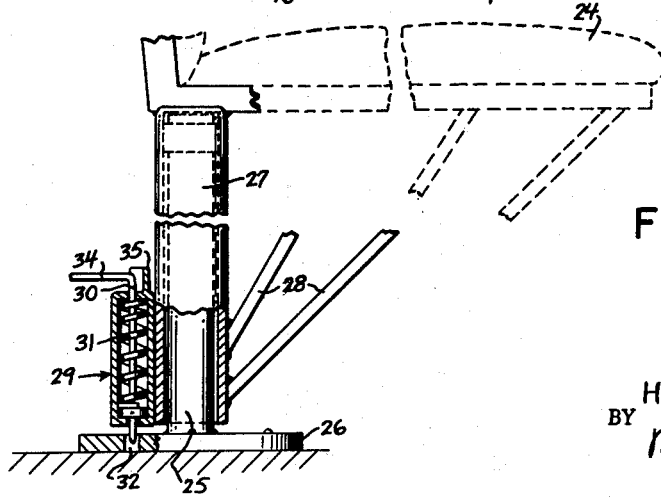
FIG. 3 is a detail side elevational view, partly in vertical section, of seat mounting and lock of the first embodiment when the seat is in driving position as seen from the right hand side of the truck.

In accordance with the present invention a seat 24 is movably mounted in the front compartment 12 to function at a driving station and at dispensing and serving positions collectively defining a vending station. The driving station is shown in full lines in FIG. 2 and the serving and dispensing positions are phantomed therein at A and B, respectively. For swing mounting the seat there is provided a pedestal 25 having a foot flange 26 bolted to the floor. The frame of the seat has a depending sleeve 27 at one corner journaled on the pedestal and this is supplemented by braces 28 sloping down to the base of the sleeve.

So that the seat can be locked in the driving position there is provided a spring lock 29 having a pin 30 which is urged downwardly by a spring 31 to seat in a hole 32 in the anchoring flange 26. The spring 31 is housed in a cylindrical retainer 33 which is fixed to the sleeve 27 and has the pin 30 extending therethrough to project upwardly and terminate by a handle 34. A lug 35 is provided at the top of the retainer so that the pin 30 can be maintained in retracted position by manually turning the handle 34 such that it overlies the lug. Otherwise the pin automatically locks in the hole 32 whenever the seat is swung into driving position beneath the steering wheel.

With the seat in driving position, the operator drives the truck to a vending site, and then, after releasing the pin 30 swings the seat 24 in the counter-clockwise direction as viewed from above until he is at the serving position facing the side window. After sliding open the pane 17 he is ready for business. When an order is received for frozen product, the operator can swing the seat 24 to the rear so that it faces the discharge gate 21 of the dispensing freezer, and after dispensing the product into a cone or other receptacle, swing the seat back from this dispensing position to the serving position where he can easily hand the product to the customer through the open window and make change from the cash drawer 20. If he wishes access to water or to the sink 18, the operator can swing the seat counter-clockwise beyond the arc defining the normal vending position. Furthermore, if he wishes to stand for a while, he can swing the seat out of the way.

Figure 4:
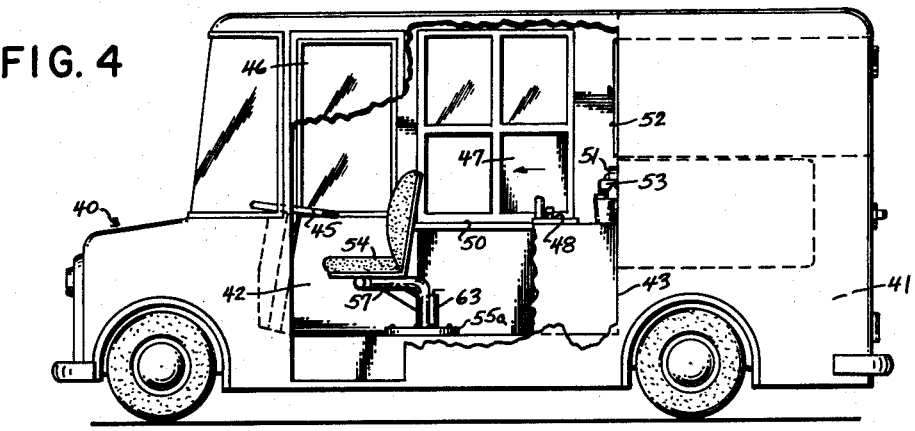
FIG. 4 is a side elevational view incorporating a second embodiment and with part of the side of the vehicle broken away.
Figure 5:
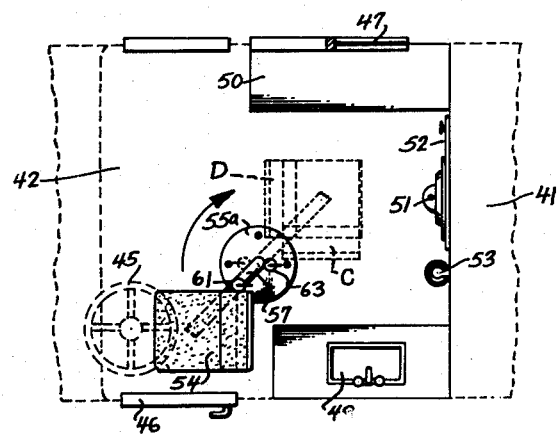
FIG. 5 is a floor plan of the driving and vending compartment of the truck of FIG. 4.
Figure 6:
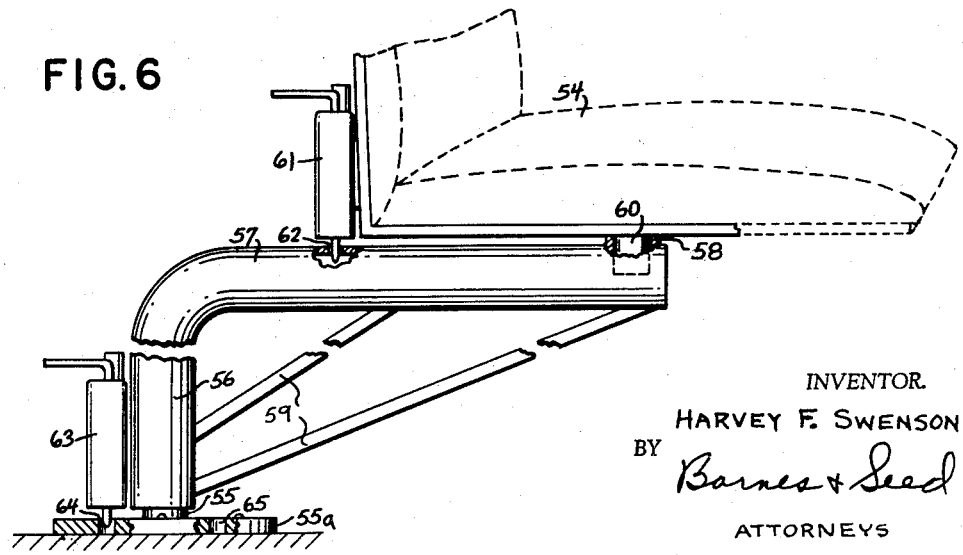
FIG. 6 is a detail side elevational view, partly in vertical section, of the seat mounting and locks of the second embodiment when the seat is in driving position and as seen from the right hand side of the truck.

Continuing to the second embodiment illustrated in FIGS. 4–6, it is seen that a modified vending truck 40 also has its body divided at 43 into a back machinery compartment 41 and a front combination driving and vending compartment 42, but that the interior of the latter has a different arrangement, particularly with respect to the location of the serving opening provided by a sliding pane 47. This opening is at the opposite side of the vehicle from the forward access door 46 and steering wheel 45, and the counter 50 is placed directly therebeneath. The sink is placed along the side wall behind the door 46 while the dispensing freezer with its discharge gate 51 and related mix cabinet 52 are housed in the rear compartment 41 and extend through the divider 43 as before. A mixer 53 is mounted beside the freezer.

Also, as before, there is mounted in the front compartment 42 a seat 54 which is swingably mounted to function at driving and vending stations, the driving station being shown in full lines in FIG. 5 and the serving and dispensing positions of the vending station being respectively phantomed therein at C, D. However, the mounting of the seat 54 varies from that of the seat 24 in that its rearward swing direction from the driving station is clockwise rather than counter-clockwise, and it has a double swing action. This is accomplished by a swing arm 57 which has a depending sleeve 56 at one end braced at 59 and an upstanding journal 58 at the other end. The sleeve 56 is journaled on a pedestal 55 anchored to the floor near the center of the compartment 42 while the journal 58 turnably receives a stub 60 projecting from beneath the frame of the seat 54. Swiveling of the seat relative to the arm 57 while the seat is in the driving station is prevented by a spring lock 61 of the type 29 before described. This lock 61 is mounted on the seat frame and has its spring loaded locking pin arranged to seat in a hole 62 on the upper face of the swing arm 57. Movement of the swing arm is similarly controlled by a spring lock 63 mounted on the sleeve 56. For the spring-loaded pin of this lock 63 there is provided a pair of holes 64–65 at diametrically opposite sides of the anchoring flange 55a of the pedestal 55. The hole 64 holds the swing arm at the driving station of the seat while the hole 65 holds it at the vending station. More particularly, the hole 65 locates the seat facing rearwardly when the lock 61 is also engaged. Then, when the lock 61 is disengaged the operator is free to swivel the seat back and forth on the projected end of the swing arm between the dispensing and serving positions of the vending station facing the dispensing freezer and the sliding pane 46, respectively. In the alternative, the operator can of course rely solely on swinging of the arm 57 to move the seat in the vending station as well as from the latter to and from the driving station. Furthermore, the operator can swing the arm 57 so that the seat faces the sink 49.

It is thought that the present invention will have been clearly understood from the foregoing detailed description of my illustrated preferred embodiments. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In combination, a vehicle having a combination driving and vending compartment with a serving opening, a freezer carried by said vehicle and having a discharge gate in said compartment, a seat in said compartment, means for mounting said seat for swinging motion about a fixed vertical axis located at one side of said seat and adjacent the rear edge thereof, said seat being swingable about said axis for movement along a predetermined travel path between a driving position, a dispensing position generally facing said gate, and a serving position generally facing said serving opening.

2. In combination, a vehicle having a compartment with a steering control, a serving opening, the discharge gate of a dispensing freezer, and a sink, a seat in said compartment, means for mounting said seat for swinging motion about a fixed vertical axis located at one side of said seat and adjacent the rear edge thereof, said seat being swingable about said axis for selective movement along a predetermined travel path between respective positions facing said steering control, serving opening, discharge gate, and sink.

References Cited by the Examiner

UNITED STATES PATENTS

| 321,970 | 7/85 | Hoffman | 62—239 |
| 1,340,853 | 5/20 | Serwe | 296—21 |
| 2,700,411 | 1/55 | Lamb | 296—65 |
| 2,700,569 | 1/55 | Koefoed | 62—239 |
| 2,858,877 | 11/58 | Krause | 297—344 |
| 3,076,517 | 2/63 | Henry-Biabaud | 296—65 |

FOREIGN PATENTS 793,578  4/58  Great Britain.

ROBERT A. O'LEARY, *Primary Examiner.*